US 8,949,915 B2

(12) United States Patent
Ramakrishnan et al.

(10) Patent No.: US 8,949,915 B2
(45) Date of Patent: Feb. 3, 2015

(54) SYSTEM AND METHOD FOR DELIVERY OF VIDEO-ON-DEMAND (75) Inventors: Kadangode Ramakrishnan, Berkeley Heights, NJ (US); Vijay Gopalakrishnan, Florham Park, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1259 days.

(21) Appl. No.: 12/254,378

(22) Filed: Oct. 20, 2008

(65) Prior Publication Data

US 2010/0100911 A1    Apr. 22, 2010

(51) Int. Cl.
*H04N 7/173* (2011.01)
*H04N 21/658* (2011.01)
*H04N 21/2225* (2011.01)
*H04N 21/472* (2011.01)
*H04N 21/4788* (2011.01)
*H04N 21/63* (2011.01)

(52) U.S. Cl.
CPC ....... *H04N 21/6582* (2013.01); *H04N 7/17318* (2013.01); *H04N 21/2225* (2013.01); *H04N 21/47202* (2013.01); *H04N 21/4788* (2013.01); *H04N 21/632* (2013.01)
USPC .......... 725/96; 725/88; 725/89; 725/91; 725/92; 725/93; 725/94; 725/95; 725/97; 725/98; 725/100

(58) Field of Classification Search
USPC .......... 725/87–89, 91–98, 100; 709/229, 232, 709/242–243
See application file for complete search history.

(56) References Cited

U.S. PATENT DOCUMENTS

| 5,568,181 | A  | * | 10/1996 | Greenwood et al. ............ 725/92 |
| 7,133,905 | B2 |   | 11/2006 | Dilley et al. |
| 2002/0007417 | A1 | * | 1/2002 | Taylor et al. ................... 709/231 |
| 2002/0143951 | A1 |   | 10/2002 | Khan et al. |
| 2002/0162109 | A1 | * | 10/2002 | Shteyn ............................. 725/87 |
| 2003/0236904 | A1 |   | 12/2003 | Walpole et al. |
| 2005/0108368 | A1 | * | 5/2005 | Mohan et al. ................. 709/220 |
| 2005/0259595 | A1 |   | 11/2005 | Preguica |
| 2006/0039388 | A1 |   | 2/2006 | Shur et al. |
| 2006/0107286 | A1 | * | 5/2006 | Connor et al. .................. 725/31 |
| 2007/0002858 | A1 |   | 1/2007 | Bichot et al. |
| 2007/0025276 | A1 |   | 2/2007 | Zwiebel et al. |
| 2007/0025277 | A1 |   | 2/2007 | Sajassi et al. |
| 2007/0067804 | A1 | * | 3/2007 | Six et al. .......................... 725/58 |
| 2007/0147411 | A1 |   | 6/2007 | Bijwaard et al. |
| 2007/0156842 | A1 | * | 7/2007 | Vermeulen et al. ........... 709/217 |
| 2007/0177554 | A1 | * | 8/2007 | Yang et al. ..................... 370/338 |

(Continued)

OTHER PUBLICATIONS

"MPEG-4," Wikipedia, The Free Encyclopedia, May 1, 2008 http://en.wikipedia.org/wiki/MPEG-4.
"MPEG-4 BIFS White Paper," ISO/IEC/JTC/1/SC/29/WG/11 N7608, Nice, France, Oct. 2005 http://www.chiariglione.org/mpeg/technologies/mp04-bifs/index.htm.

(Continued)

*Primary Examiner* — Jason Salce
(74) *Attorney, Agent, or Firm* — Guntin & Gust, PLC; Douglas Schnabel (57) ABSTRACT A method of providing video-on-demand content includes receiving a request from a set-top box, and determining the video-on-demand content is not stored locally. The request includes a content identifier for the video-on-demand content. The method further includes identifying a peer likely to have the video-on-demand content, receiving at least a first portion of the video-on-demand content from the peer, and providing the video-on-demand content to the set-top box.

12 Claims, 10 Drawing Sheets

(56) References Cited

U.S. PATENT DOCUMENTS

| | | |
|---|---|---|
| 2007/0177594 A1 | 8/2007 | Kompella |
| 2007/0183418 A1 | 8/2007 | Riddoch et al. |
| 2008/0016350 A1 | 1/2008 | Braskich et al. |
| 2008/0059631 A1* | 3/2008 | Bergstrom et al. ........... 709/224 |
| 2008/0101360 A1 | 5/2008 | Napierala |
| 2008/0104643 A1* | 5/2008 | Shao et al. ...................... 725/87 |
| 2009/0300045 A1* | 12/2009 | Chaudhry et al. ........... 707/102 |

OTHER PUBLICATIONS

"CPM—Adaptive Video-on-Demand with Peer Assist and Multicast," Bhattacharjee et al., AT&T Labs Research, NJ, Dec. 2007.

"CPM—Specifications," Gopalkrishnan et al., May 22, 2008.

"P2Cast: Peer-to-Peer Patching Scheme for VoD Service," Guo et al., Dept. of Computer Science, University of Massachusetts at Amherst, MA, 2003, www.cs.umass.edu.

* cited by examiner

SYSTEM AND METHOD FOR DELIVERY OF VIDEO-ON-DEMAND

FIELD OF THE DISCLOSURE

The present disclosure generally relates to Internet Protocol Television (IPTV) networks, and more particularly relates to a system and method for delivery of video-on-demand.

BACKGROUND

Video-on-demand (VOD) service allows a television viewer to see a program at a time of their choosing. This stands in contrast to traditional broadcast television service that requires a viewer to select from a list of programs that are shown at a predetermined time. VOD service offers viewers advantages over traditional television service.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
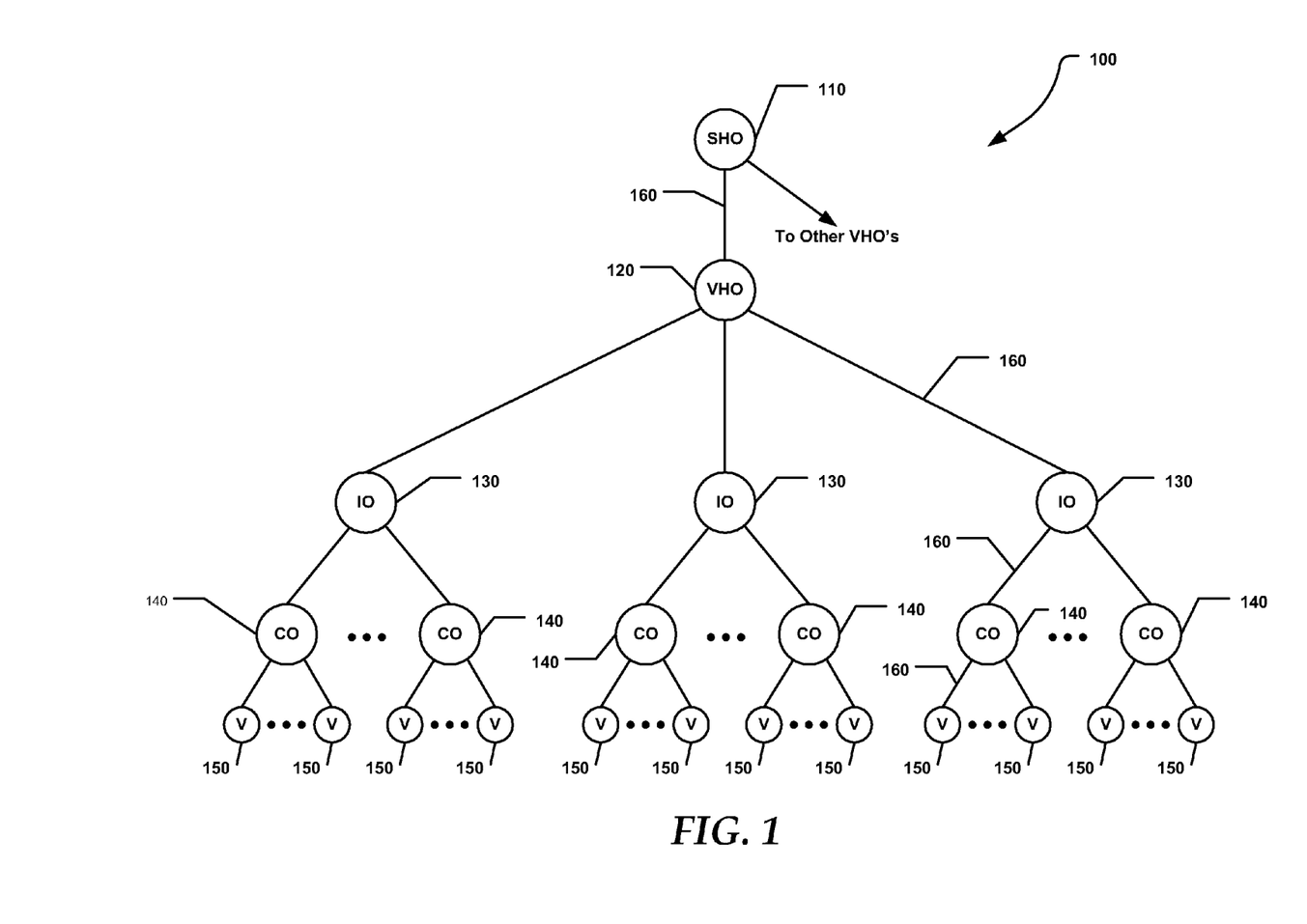
FIGS. 1, 2, and 3 are block diagrams illustrating an embodiment of an Internet Protocol Television (IPTV) network.

FIG. 1 shows one example embodiment of a television distribution system or network 100, using IPTV technology in this example but not limited thereto, adapted to provide, among other things, the VOD features of the disclosed subject matter. The network 100 may include a super hub office (SHO) 110 for acquisition and encoding of video content, one or more video hub offices (VHO) 120 in each demographic market area (DMA), one or more intermediate offices (IO) 130, one or more central offices (CO) 140 located in each metropolitan area, and viewer premises equipment 150 that may be located in single or multiple dwelling units. In one example embodiment, the network 100 may be connected through a plurality of high-speed communication links 160 using physical transport layers such as fiber, cable, twisted pair, air, or other media.

In one example embodiment of the IPTV video delivery system, the SHO 110 distributes content to one or more VHOs 120 which may be spread across a wide geographic territory, such as an entire country. The SHO 110 may, for example, be in a central location for acquisition and aggregation of national-level broadcast TV (or linear) programming. A redundant SHO 110 may be provided for backup in case of failure. The SHO 110 may also provide the central point of on-demand content acquisition and insertion into the IPTV network. Linear programming may be received at the SHO 110 via satellite and processed for delivery to the VHO 120. Linear programming may also be converted and stored for use as VOD content. Additional VOD content may be received from various sources and processed/encoded to codec and bit rate requirements for the communication network for transmission to the VHO 120 over the high speed communication links. The VHOs 120 are the video distribution points within each DMA or geographic region.

Figure 2:
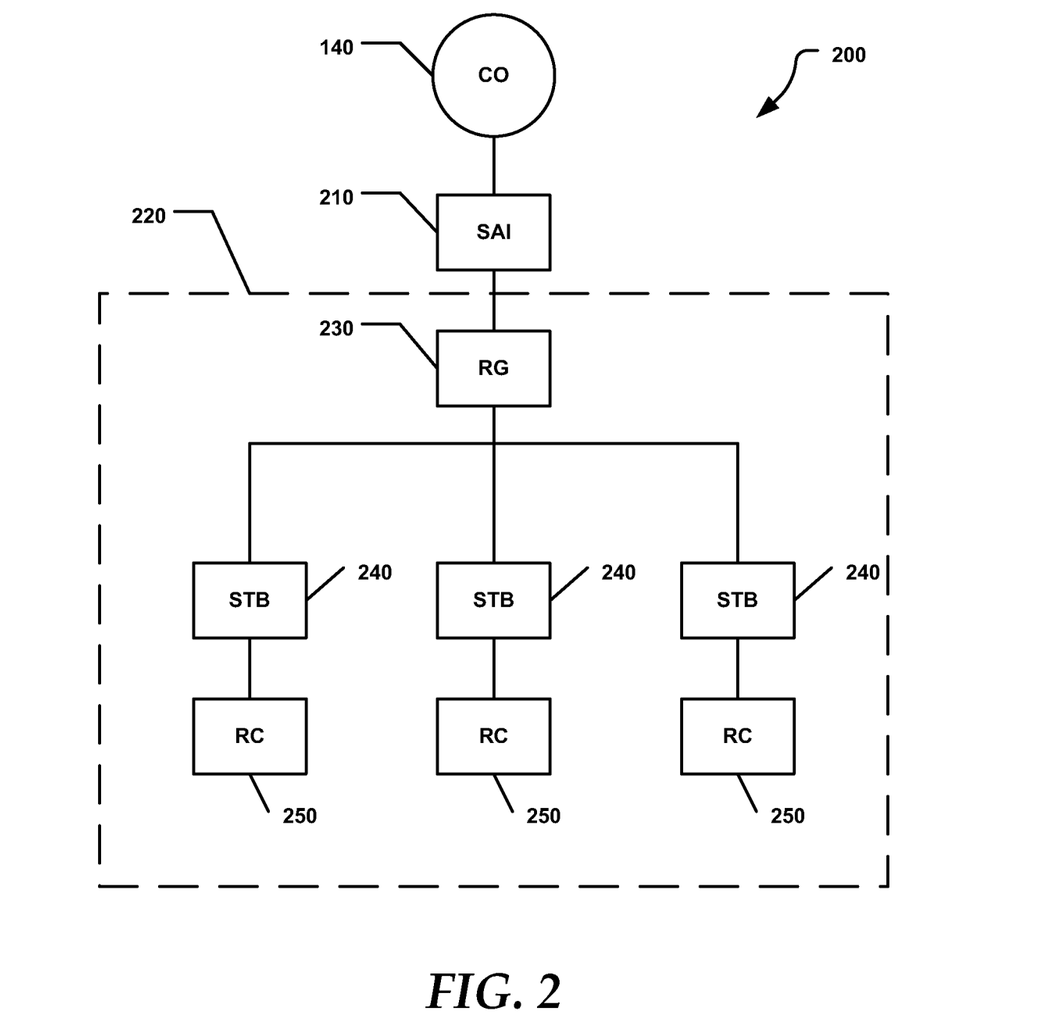

FIG. 2 shows an example network architecture 200 between the CO 140 and the viewer. A serving area interface (SAI) 210 may be connected to the CO 140. SAI 210 may, for example, be located in a weather-proof enclosure proximate to the viewer premises, and may include fiber-to-the-node (FTTN) equipment. FTTN equipment may also be located in the CO 140. Customer premises equipment (CPE) 220 includes, for example, a network interface device (NID) and a residential gateway (RG) 230, with a built-in very-high-bit rate digital subscriber loop (VDSL) modem or optical network termination (ONT). In either case the RG 230 may be connected to the rest of the home STBs 240 via an internal network such as an Ethernet. Each STB 240 has an associated remote control (RC) 250 that provides data entry to the STB 240 to control the IPTV selections from the IPTV data streams.

Figure 3:
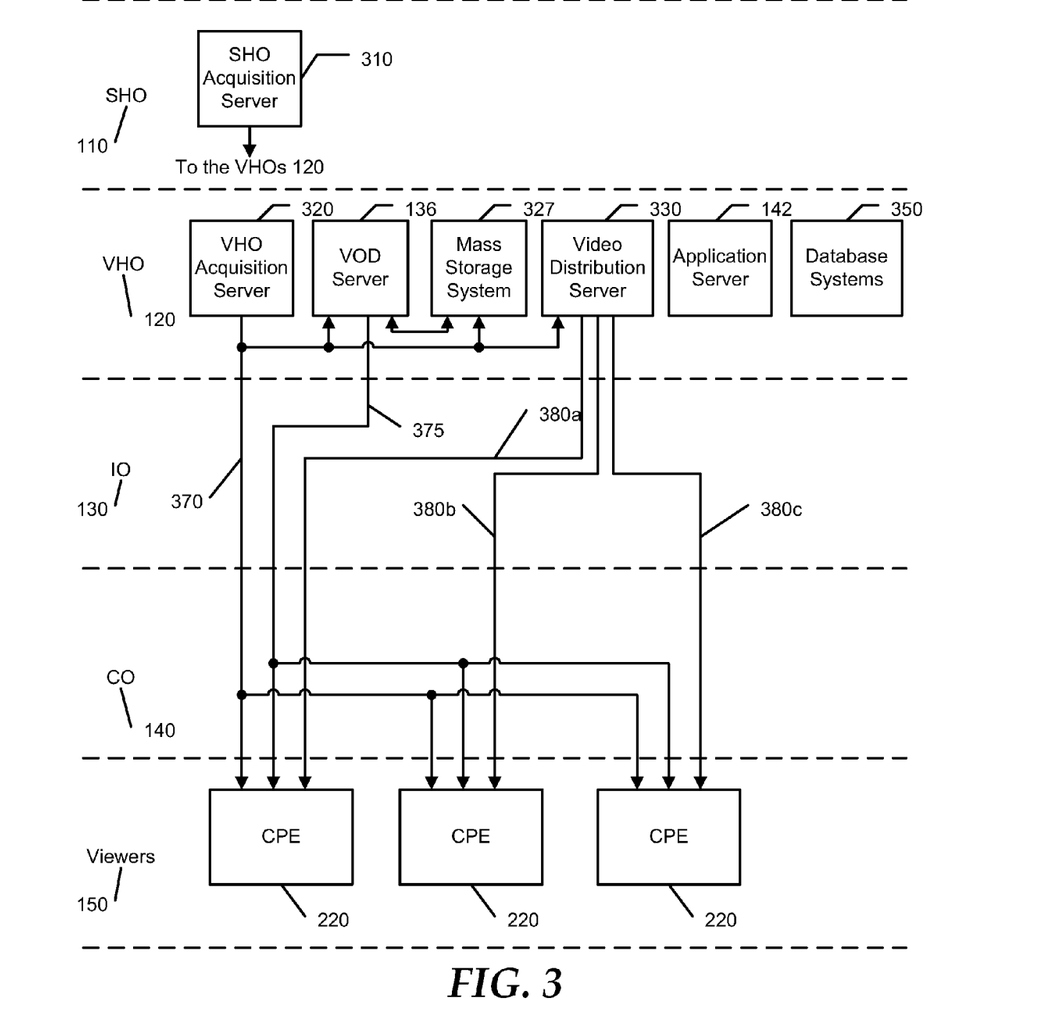

FIG. 3 shows one example embodiment of an SHO acquisition server 310 that may be used to acquire national content to be distributed towards the VHO 120. In an alternative embodiment, live television content may be acquired using an acquisition server 320 in the VHO 120. In this configuration, the VHO 120 may include the live television acquisition server 320 and a video distribution server 330, which forward the live television and/or other content toward the viewer premises equipment 150 through the intermediate offices (IOs) 130 and the central office (CO) 140. A VHO 120 may also include application server 340, and regional viewer 150 database systems 350. Traffic may reach the viewer premises equipment 150 at least partially via either FTTN or fiber to the premises (FTTP), or by other types of transmission medium.

The acquisition server 320 may distribute a plurality of live television programs, each typically associated with a television "channel," using a multicast IP protocol data stream 370 through the IOs 130 and COs 140 to the viewer premises equipment 150. The routers, switches, and other network elements that would normally be present in the IOs 130 and COs 140 are not shown in FIG. 3 in order to simplify the drawing. The number of programs or channels sent in the multicast stream may, without limitation, range up to 700 channels or more using present technology, with it being understood that advances in technology may allow many more channels to be sent. The multicast protocol allows for efficient distribution of these signals to a large number of viewer premises equipment 150. In addition, the video distribution server 330 receives the multicast data stream 370, and distributes selected ones of the live television signals, extracted from the stream 370, using a unicast data stream 380a, 380b, or 380c, to specific viewer premises equipment 150.

Also provided in the VHO 120, or alternatively at another distribution point in the IPTV network such as the SHO 110, IO 130, or CO 140, is a VOD server 390 that distributes content to viewer premises equipment 150. VHO 120 may be connected to, in one example embodiment, one or more mass storage devices or systems 327, such as magnetic disk drives or optical recording systems. In addition, VOD server 390 includes software to support interaction with viewer premises equipment 150 through STB 240. For example, viewers can interact with the VOD server 390 using the remote control 250 and an STB 240 to request delivery of the content to them from VOD server 390. The STB 240 may request content on VOD server 390, which is delivered, in one example embodiment, with multicast data stream 375. Alternatively, the content may be delivered with a unicast data stream from the VOD server 390 to the STB 240.

According to one embodiment, access to programming under the control of VOD server 390, or alternatively access to regularly scheduled programming on the television channels, may be controlled by an STB 240 in the viewer's premises. Thus, in one example embodiment, the VOD server 390 provides television programming upon demand by viewers as more fully described herein.

According to one example embodiment, referring to FIGS. 2 and 3, TV shows may be monitored on the viewer side, for example in the STB 240. On the viewer side, the STB 240 can receive viewer-initiated control commands from, for example the RC 250, such as channel changes, video-on-demand program ordering, and other control information. This information can be used to collect accurate information of all the viewers' TV viewing information by querying each individual viewer's STB 240. Alternatively, if such statistics are not available from the STB 240, viewer 150 viewing information can be obtained from the RG 230 based on IP multicast information obtained from the RG. In another embodiment, the viewer 150 viewing information may be obtained from the VHO 120 based on, for example, VOD requests sent from the STB 240 to the VOD server 390 in VHO 120. As a result, viewing information can be collected from the VOD server 390 and used to determine the overall viewing of a particular show, such as for billing or determining popularity of the content.

In an embodiment, VOD servers can be located throughout a communications network, such as the Internet or a cellular data network. The VOD servers can provide VOD content to devices within the communications network including cell phones, computers, or other devices capable of receiving and displaying VOD content. A device can receive the VOD content from a VOD server closest to the device within the network.

Figure 4:
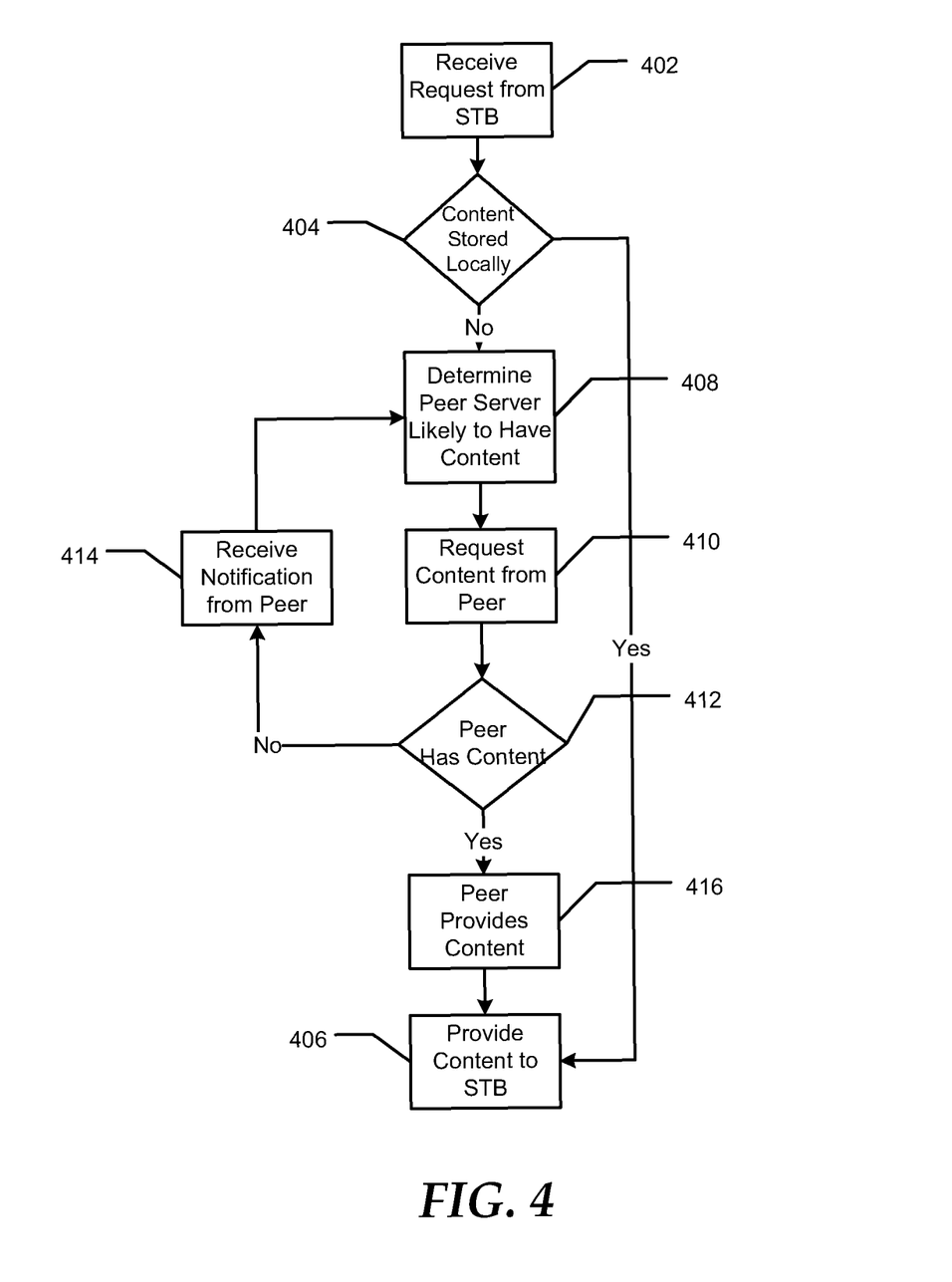
FIG. 4 is a flow diagram illustrating an exemplary method of retrieving VOD content in accordance with one embodiment of the present disclosure.

FIG. 4 is a flow diagram illustrating an exemplary method for providing VOD content to an STB, such as STB 240. At 402, a VHO, such as VHO 120, can receive a request for VOD content from the STB. The request can include a content identifier for the VOD content. The content identifier can be a serial number that uniquely identifies the VOD content. At 404, the VHO can determine if the requested VOD content is stored locally. When the VOD content is stored locally, the VHO can provide the VOD content to the STB, as illustrated at 406.

Alternatively, when the VOD content is not stored locally, the VHO can identify a peer server likely to have the VOD content, as illustrated at 408. In an embodiment, the VHO can request a list of peer servers likely to have the VOD content from a directory server. Alternatively, the VHO can identify the peer server likely to have the VOD content based on the information, such as a bloom filter, indicating the plurality of content stored at the peer server. The peer server can be a VOD server or other type of server located within the network. Particularly, the peer server may be located at a different VHO. Alternatively, the peer server may be a content provider server or part of another service providers network. At 410, the VHO can send a request for the VOD content to the identified peer server. The request can include the content identifier. At 412, the peer server can determine if the peer server can provide the VOD content to the VHO. When the peer server cannot provide the VOD content, the peer server can send a notification to the VHO, as illustrated at 414. In an embodiment, the peer server may be unable to provide the VOD content when the peer server does not have a copy of the VOD content, when the peer server is currently overloaded, when the network connection between the peer server and the VHO is saturated, other factors that may prevent the delivery of the VOD content at a sufficient rate, or any combination thereof. The peer server may not have the VOD content when the information used to identify the peer server is out-of-date or otherwise generates a false positive. At 408, the VHO can identify another peer server likely to have the VOD content.

Alternatively, when the peer server can provide the VOD content, the VHO can receive the VOD content from the peer server, as illustrated at 416. In an embodiment, the VHO may retrieve a first portion of the VOD content from a first peer server and a second portion of the VOD content from a second peer server. The VHO may receive the first and second portions substantially simultaneously or sequentially. At 406, the VHO can provide the VOD content to the STB.

Figure 5:
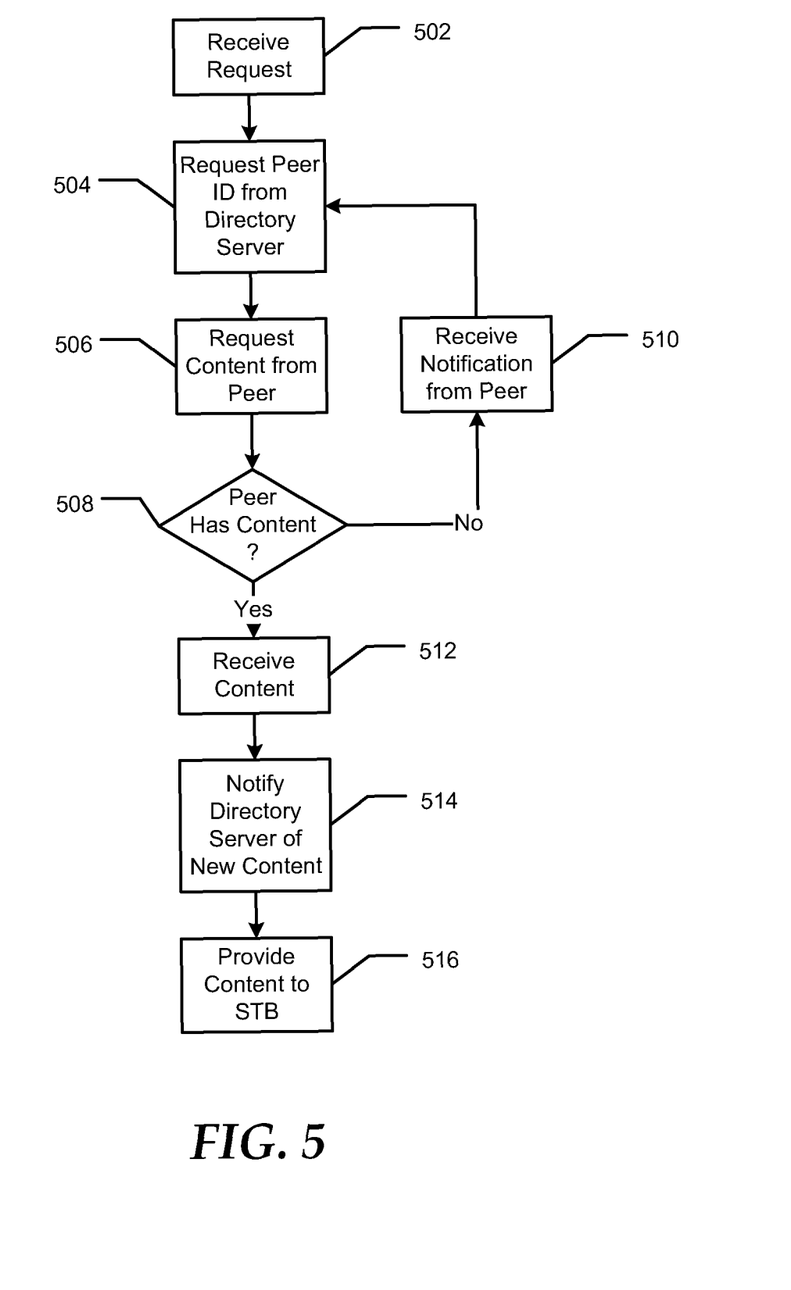
FIG. 5 is a flow diagram illustrating an exemplary method of identifying a peer for retrieving VOD content in accordance with one embodiment of the present disclosure.

FIG. 5 is a flow diagram illustrating a method of receiving content from a peer server. At 502, a VHO, such as VHO 120, can receive a request for VOD content from an STB, such as STB 240. The request can include an identifier indicating the requested VOD content. At 504, the VHO can request a peer identifier from a directory server. The directory server may be a centralized directory server or a distributed directory server. The distributed directory server may include a plurality of redundant systems distributed throughout the IPTV network, such that the load is distributed across the plurality of redundant systems. The peer identifier can indicate a peer server that is likely to have the requested VOD content. In an embodiment, the peer server can be located at another VHO or elsewhere in the IPTV network. At 506, the VHO can request the VOD content from the peer server identified by the directory server. The request can include the content identifier. At 508, the peer server can determine if VOD content can be provided to the VHO. When the peer server cannot provide the VOD content, the peer server can send a notification to the VHO, as illustrated at 510, and the VHO can request the identify of another peer server from the directory server, as illustrated at 504.

Alternatively, when the peer server can provide the VOD content, the VHO can receive the VOD content from the peer server, as illustrated at 512. In an embodiment, the VHO may retrieve multiple portions of the VOD content from multiple peer servers. At 514, the VHO can notify the directory server of the newly received VOD content. Additionally, the VHO can provide the VOD content to the STB, as illustrated at 516.

Figure 6:
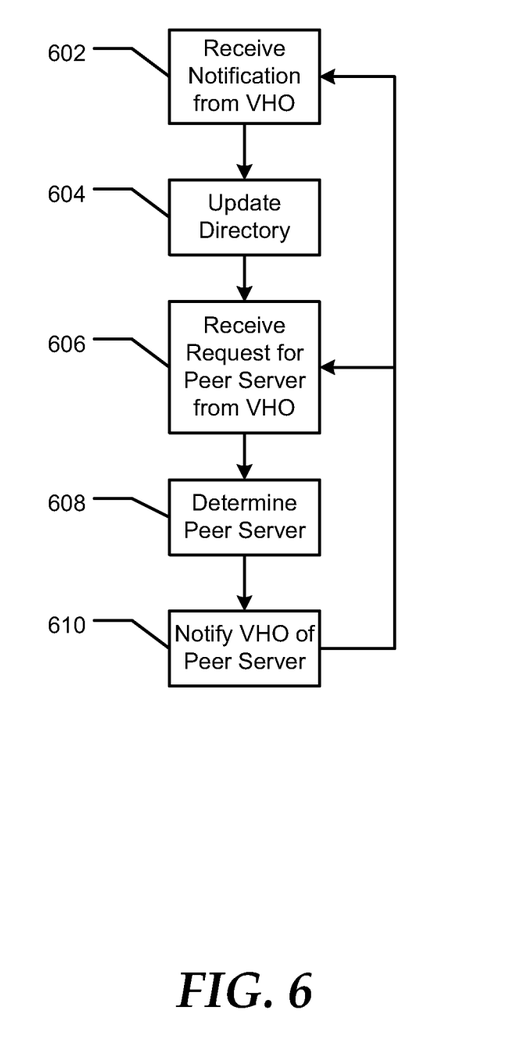
FIG. 6 is a flow diagram illustrating an exemplary method of maintaining a list of peers having VOD content in accordance with one embodiment of the present disclosure.

FIG. 6 is a flow diagram illustrating a method of managing storage of VOD content. At 602, a directory server can receive a notification from a VHO. The notification can indicate a change in the VOD content stored at the VHO. For example, the notification can identify VOD content added to local storage at the VHO or VOD content deleted from local storage at the VHO. At 604, the directory server can update a database or a directory to indicate the change in the VOD content stored by the VHO. In an embodiment, the directory may include a list of VHOs each storing of a plurality of VOD content. In an alternate embodiment, the directory may include a list of VOD content stored by each of a plurality of VHOs. In a further embodiment, the directory may utilize bloom filters for each VHO. The bloom filters can allow for relatively efficient storage of the list of content stored at each VHO and can allow rapid searching to identify VHOs likely to have a particular VOD content.

At 606, the directory server can receive a request to identify a peer server likely to have the particular VOD content from the VHO. The request can include a content identifier to identify the particular VOD content. At 608, the directory server can identify a peer server able to provide the VOD content to the VHO. The peer server can be a VOD server or other server located within the IPTV network. In an embodiment, the directory server may identify a plurality of peer servers likely to have the VOD content. The directory server can utilize a preferred source policy to identify an optimal peer server for providing the VOD content to the VHO. The preferred source policy can be based on network topology, bandwidth availability, peer server capacity, peer server load, other factors that may affect the transmission of the VOD content to the VHO, or any combination thereof. At 610, the directory server can send a notification to the VHO. The notification can include the identity of one or more peer servers. In an embodiment, a plurality of peer servers may each store a portion of the VOD content. The directory server may receive a notification from the VHO, as illustrated at 602, or a request for a peer server from the VHO, as illustrated at 606.

In an embodiment, the directory server may instruct the VHO to store at least a portion of the VOD content. Alternatively, the directory server can provide information, such as popularity, distribution of portions of the VOD content, and the like, to enable the VOD server to determine when to store at least a portion of the VOD content. The decision to store a portion of the VOD content can be based on a replication policy. The replication policy can require that at least one copy of each portion of the VOD content is stored somewhere in the network at all times. In an embodiment, additional portions of popular content may be stored at additional locations in the network. The policy can direct the distribution of the popular content to reduce the network overhead associated with transferring content from a peer server storing a portion of the VOD content to a VHO providing the content to an STB. For example, the portions may be distributed throughout the network to minimize the distance between peer servers storing a VOD content and VHOs without the content. Additionally, the VOD content may be concentrated in regions in which the VOD content is popular.

In another embodiment, the directory server may direct the peer server to provide the VOD content as a multicast to a plurality of VHOs to pre-populate the VHOs with popular content. Additionally, in order to distribute popular VOD content, the directory server may instruct specific peer servers located throughout the network to receive the multicast of the VOD content and store at least a portion of the VOD content.

Figure 7:
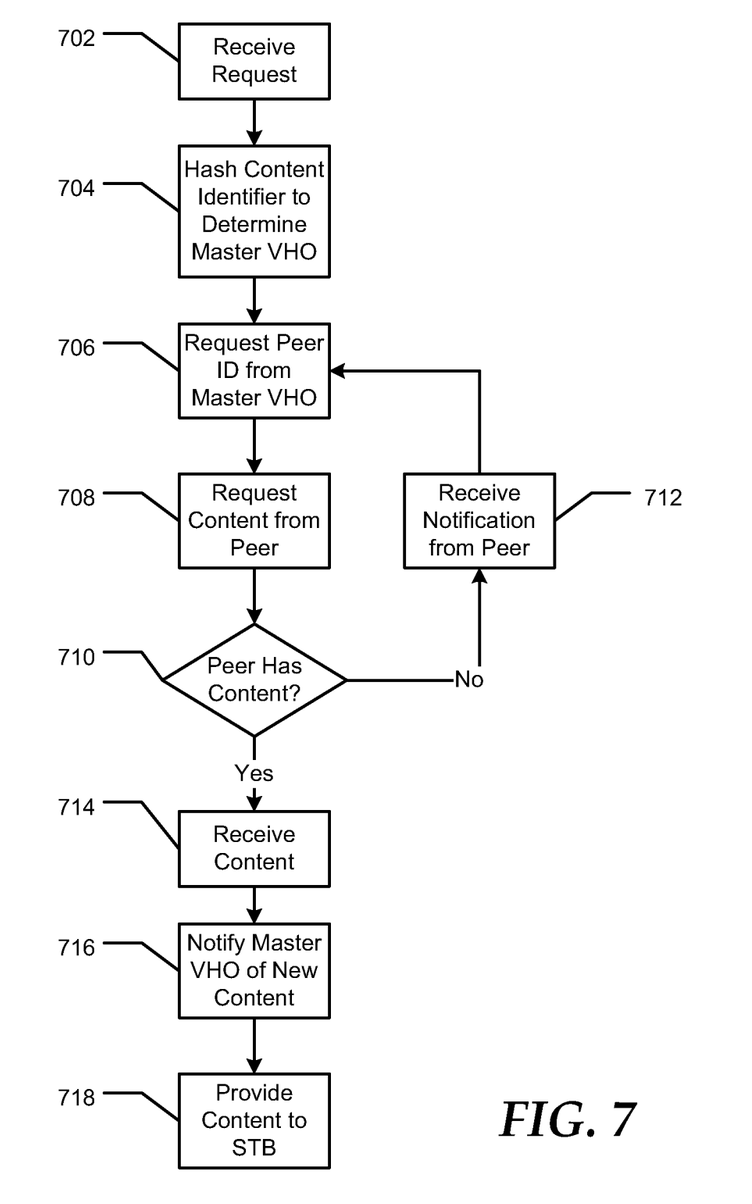
FIG. 7 is a flow diagram illustrating an exemplary method of retrieving VOD content from a peer in accordance with one embodiment of the present disclosure.

FIG. 7 is a flow diagram illustrating a method of retrieving VOD content from a peer. At 702, a VHO, such as VHO 120, can receive a request for VOD content from an STB, such as STB 240. The request can include a content identifier indicating the requested VOD content. At 704, the VHO can determine a master server responsible for the content. The master server can be a VOD server, a peer server, or other type of server that tracks which peer servers have copies of the VOD content. Multiple master servers can be distributed throughout the IPTV network with each master server being responsible for a subset of VOD content. A hash function can be used to generate a content hash based on the content identifier. The master server can be the server with a server identifier or a server hash that most closely matches the content hash. The server hash can be a hash of the server identifier. In an embodiment, the master server may store a master copy of a particular VOD content. Alternatively, a different hash algorithm can be used to determine which server stores the master copy of the particular VOD content. Additionally, the master server may manage the replication of VOD content throughout the network in a manner similar to that previously described with respect to the directory server.

At 706, the VHO can request a peer identifier from the master server. The peer identifier can indicate a peer that is likely to have the requested VOD content. In an embodiment, the master server can identify the peer in a manner similar to that previously described with respect to the directory server. At 708, the VHO can request the VOD content from the peer server identified by the master server. The request can include the content identifier. At 710, the peer server can determine if the peer server can provide the VOD content to the VHO. When the peer server cannot provide the VOD content, the peer server can send a notification to the VHO, as illustrated at 712, and the VHO can request the identity of another peer server from the master server, as illustrated at 706.

Alternatively, when the peer server can provide the VOD content, the VHO can receive the VOD content from the peer server, as illustrated at 714. In an embodiment, the master server may provide the VHO with the identity of multiple peer servers and the VHO may retrieve multiple portions of the VOD content from the multiple peer servers. At 716, the VHO can notify the directory server of the new content. Additionally, the VHO can provide the VOD content to the STB, as illustrated at 718.

In an embodiment, the VHO may cache a prefix portion for a plurality of VOD content. For example, the VHO may cache the first 10 minutes of each VOD content. The remaining portion of each VOD content can be distributed among peer servers as previously described. In this way, delivery of a requested VOD content can begin substantially immediately upon receiving a request from a user. While the user is viewing the prefix portion of the requested VOD content, the VHO can retrieve additional portions of the requested VOD content.

Figure 8:
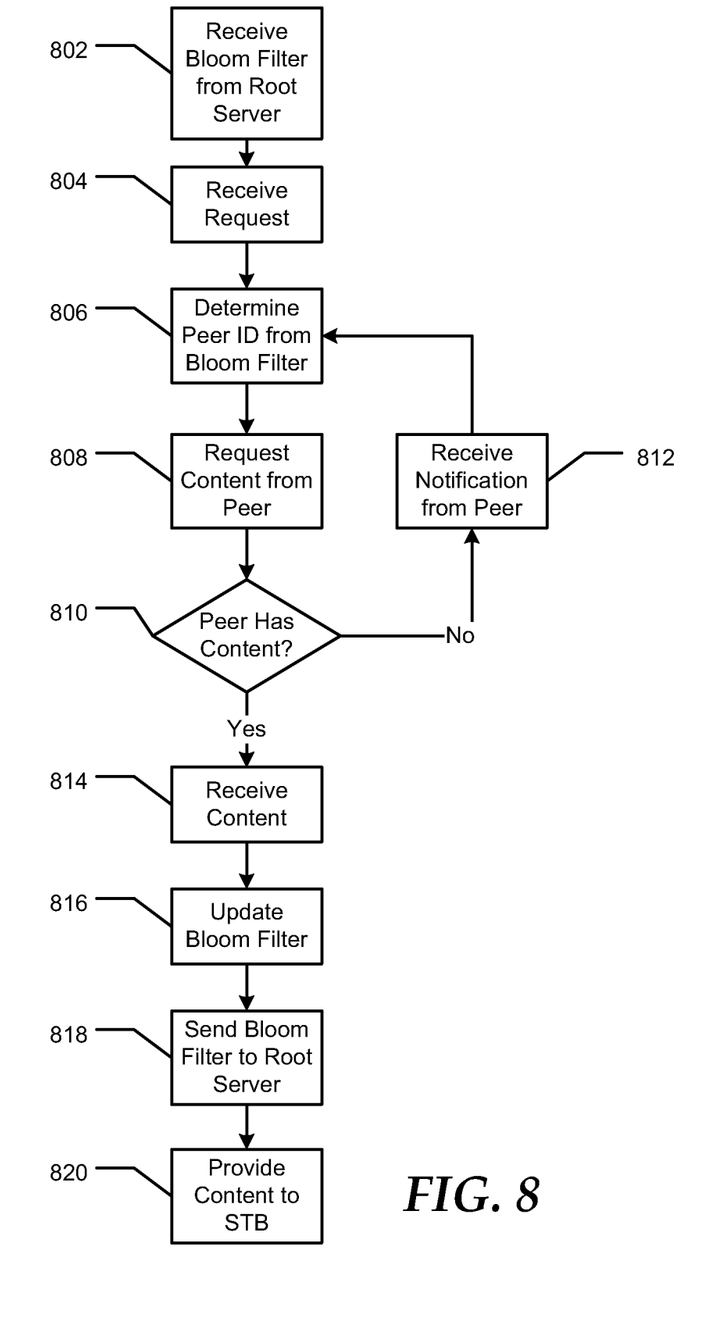
FIG. 8 is a flow diagram illustrating another exemplary method of retrieving VOD content from a peer in accordance with one embodiment of the present disclosure.

FIG. 8 is a flow diagram illustrating a method of retrieving VOD content from a peer server. At 802, a VHO, such as VHO 120, can receive a plurality of bloom filters from a root server. In an embodiment, the plurality of bloom filters can be multicast from the root server to a plurality of VHOs. In another embodiment, the VHO can receive a bloom filter from each of a plurality of peer servers. The plurality of bloom filters can be used to store, in a space efficient manner, information about the VOD content stored on each of a plurality of peer servers. Additionally, the bloom filter can be searched relatively quickly to determine which peer server is likely to have the VOD content.

At 804, the VHO can receive a request for the VOD content from an STB, such as STB 924. At 806, the VHO can identify a peer server likely to have the VOD content from the bloom filters. In an embodiment, the VHO may have a bloom filter for each of the peer servers indicating which content is stored on the peer server. The VHO can check the bloom filters sequentially until a peer likely to have the content is identified. The order in which the bloom filters are searched can be based on a search policy. The search policy can be based on network topology, bandwidth availability, peer server capacity, peer server load, past performance, other factors that may affect the transmission of the VOD content to the VHO, or any combination thereof.

At 808, the VHO can request the VOD content from the peer server. The request can include the content identifier. At 810, the peer server can determine if the peer server can provide the VOD content to the VHO. When the peer server cannot provide the VOD content, the peer server can send a notification to the VHO, as illustrated at 812, and the VHO can determine another peer server using the bloom filters, as illustrated at 806.

Alternatively, when the peer server can provide the VOD content, the VHO can receive the VOD content from the peer server, as illustrated at 814. In an embodiment, the VHO can identify multiple peer servers and may retrieve multiple portions of the VOD content from the multiple peer servers. At 816, the VHO can update a bloom filter to indicate that the VOD content is now stored at the VHO. At 818, the VHO can send the updated bloom filter to the root server. Additionally, the VHO can provide the VOD content to the STB, as illustrated at 820.

In an embodiment, a peer server may be assigned to maintain a master copy of the VOD content. Similar to the master server previously described, a hash of the content identifier can be used to determine which peer server is responsible for maintaining the master copy of a particular VOD content. In another embodiment, a storage server may be used to maintain master copies of all the VOD content. Such mechanisms can increase the probability that a master copy of each VOD content is available somewhere in the IPTV network.

Figure 9:
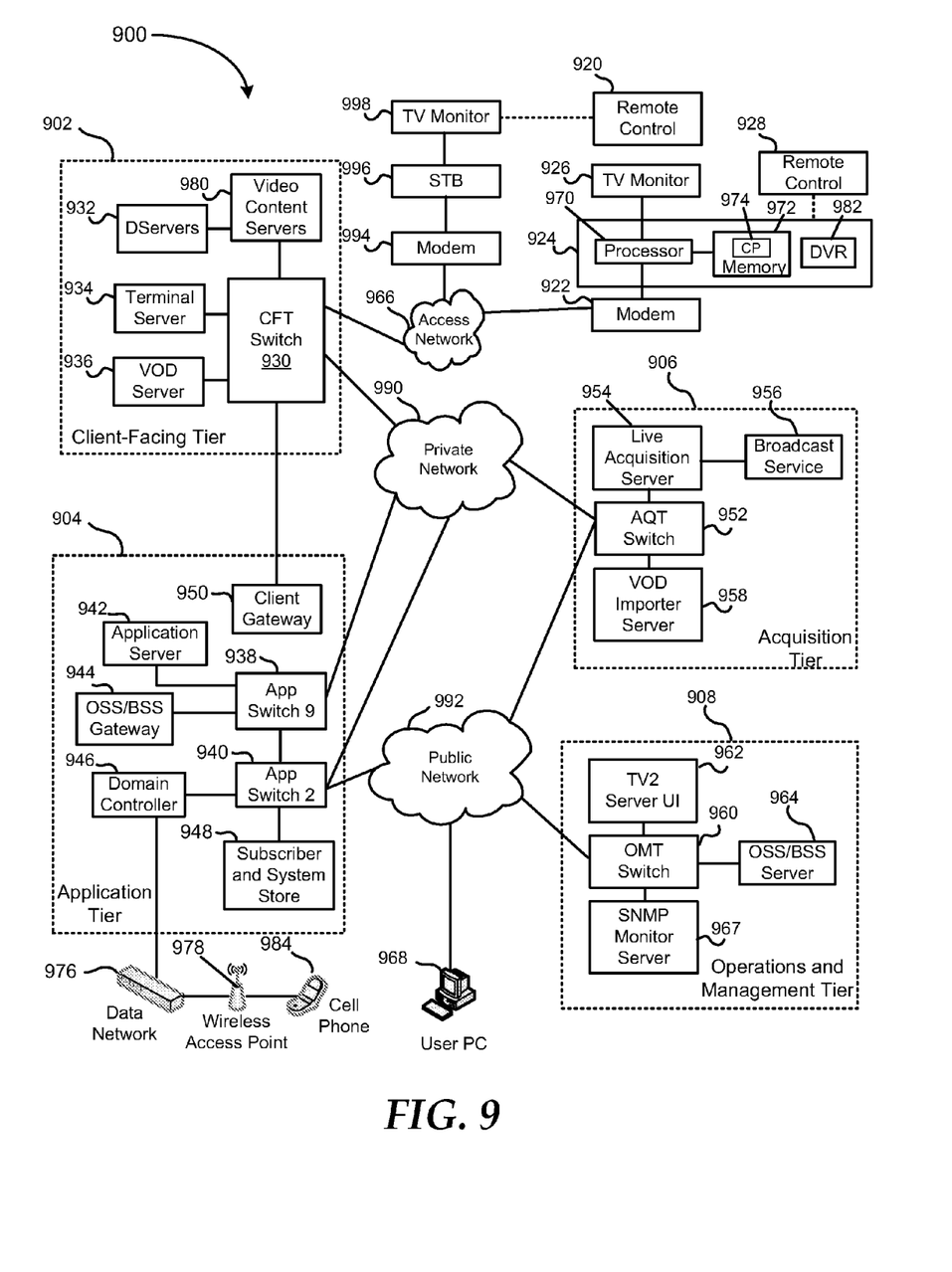
FIG. 9 is a block diagram illustrating an IPTV network in accordance with one embodiment of the present disclosure.

FIG. 9 shows an IPTV system 900 including a client facing tier 902, an application tier 904, an acquisition tier 906, and an operations and management tier 908. Each tier 902, 904, 906, and 908 is coupled to one or both of a private network 910 and a public network 912. For example, the client-facing tier 902 can be coupled to the private network 910, while the application tier 904 can be coupled to the private network 910 and to the public network 912 such as the Internet. The acquisition tier 906 can also be coupled to the private network 910 and to the public network 912. Moreover, the operations and management tier 908 can be coupled to the public network 912.

The various tiers 902, 904, 906, and 908 communicate with each other via the private network 910 and the public network 912. For instance, the client-facing tier 902 can communicate with the application tier 904 and the acquisition tier 906 via the private network 910. The application tier 904 can also communicate with the acquisition tier 906 via the private network 910. Further, the application tier 904 can communicate with the acquisition tier 906 and the operations and management tier 908 via the public network 912. Moreover, the acquisition tier 906 can communicate with the operations and management tier 908 via the public network 912. In a particular embodiment, elements of the application tier 904 can communicate directly with the client-facing tier 902.

The client-facing tier 902 can communicate with user equipment via a private access network 966, such as an IPTV network. In an illustrative embodiment, modems such as a first modem 914 and a second modem 922 can be coupled to the private access network 966. The client-facing tier 902 can communicate with a first representative set-top box (STB) device 916 via the first modem 914 and with a second representative set-top box device 924 via the second modem 922. The client-facing tier 902 can communicate with a large number of set-top boxes over a wide geographic area, such as a regional area, a metropolitan area, a viewing area, or any other suitable geographic area that can be supported by networking the client-facing tier 902 to numerous set-top box devices. In one embodiment, the client-facing tier 902 can be coupled to the modems 914 and 922 via fiber optic cables. Alternatively, the modems 914 and 922 can be digital subscriber line (DSL) modems that are coupled to one or more network nodes via twisted pairs, and the client-facing tier 902 can be coupled to the network nodes via fiber-optic cables. Each set-top box device 916 and 924 can process data received from the private access network 966 via an IPTV software platform such as Microsoft® TV IPTV Edition.

The first set-top box device 916 can be coupled to a first display device 918, such as a first television monitor, and the second set-top box device 924 can be coupled to a second display device 926, such as a second television monitor. Moreover, the first set-top box device 916 can communicate with a first remote control 920, and the second set-top box device can communicate with a second remote control 928. In an exemplary, non-limiting embodiment, each set-top box device 916 and 924 can receive data or video from the client-facing tier 902 via the private access network 966 and render or display the data or video at the display device 918 or 926 to which it is coupled. The set-top box devices 916 and 924 thus may include tuners that receive and decode television programming information for transmission to the display devices 918 and 926. Further, the set-top box devices 916 and 924 can include an STB processor 970 and an STB memory device 972 that is accessible to the STB processor. In a particular embodiment, the set-top box devices 916 and 924 can also communicate commands received from the remote controls 920 and 928 back to the client-facing tier 902 via the private access network 966.

In an illustrative embodiment, the client-facing tier 902 can include a client-facing tier (CFT) switch 930 that manages communication between the client-facing tier 902 and the private access network 966 and between the client-facing tier 902 and the private network 910. As shown, the CFT switch 930 is coupled to one or more data servers 932 that store data transmitted in response to user requests, such as video-on-demand material. The CFT switch 930 can also be coupled to a terminal server 934 that provides terminal devices, such as a game application server and other devices with a common connection point to the private network 910. In a particular embodiment, the CFT switch 930 can also be coupled to a VOD server 936.

The application tier 904 can communicate with both the private network 910 and the public network 912. In this embodiment, the application tier 904 can include a first application tier (APP) switch 938 and a second APP switch 940. In a particular embodiment, the first APP switch 938 can be coupled to the second APP switch 940. The first APP switch 938 can be coupled to an application server 942 and to an OSS/BSS gateway 944. The application server 942 provides applications to the set-top box devices 916 and 924 via the private access network 966, so the set-top box devices 916 and 924 can provide functions such as display, messaging, processing of IPTV data and VOD material. In a particular embodiment, the OSS/BSS gateway 944 includes operation systems and support (OSS) data, as well as billing systems and support (BSS) data.

The second APP switch 940 can be coupled to a domain controller 946 that provides web access, for example, to users via the public network 912. The second APP switch 940 can be coupled to a subscriber and system store 948 that includes account information, such as account information that is associated with users who access the system 900 via the private network 910 or the public network 912. In a particular embodiment, the application tier 904 can also include a client gateway 950 that communicates data directly to the client-facing tier 902. In this embodiment, the client gateway 950 can be coupled directly to the CFT switch 930. The client gateway 950 can provide user access to the private network 910 and the tiers coupled thereto.

For example, when the set-top box device 916 accesses the system 900 via the private access network 966, the client gateway 950 can verify viewer information by communicating with the subscriber and system store 948 via the private network 910, the first APP switch 938 and the second APP switch 940. Further, the client gateway 950 can verify billing information and status by communicating with the OSS/BSS gateway 944 via the private network 910 and the first APP switch 938. The OSS/BSS gateway 944 can transmit a query across the first APP switch 938, to the second APP switch 940, and the second APP switch 940 can communicate the query across the public network 912 to the OSS/BSS server 964. After the client gateway 950 confirms viewer and/or billing information, the client gateway 950 can allow the set-top box device 916 access to IPTV content and VOD content. If the client gateway 950 cannot verify viewer information for the set-top box device 916, such as because it is connected to a different twisted pair, the client gateway 950 can deny transmissions to and from the set-top box device 916 beyond the private access network 966.

The acquisition tier 906 includes an acquisition tier (AQT) switch 952 that communicates with the private network 910. The AQT switch 952 can also communicate with the operations and management tier 908 via the public network 912. In a particular embodiment, the AQT switch 952 can be coupled to a live acquisition server 954 that receives television content, for example, from a broadcast service 956. Further, the AQT switch can be coupled to a VOD importer server 958 that stores television content received at the acquisition tier 906 and communicate the stored content to the client-facing tier 902, such as to VOD server 936, via the private network 910.

The operations and management tier 908 can include an operations and management tier (OMT) switch 960 that conducts communication between the operations and management tier 908 and the public network 912. In the illustrated embodiment, the OMT switch 960 is coupled to a TV2 server 962. Additionally, the OMT switch 960 can be coupled to an OSS/BSS server 964 and to a simple network management protocol (SNMP) monitor 967 that monitors network devices. In a particular embodiment, the OMT switch 960 can communicate with the AQT switch 952 via the public network 912.

In a particular embodiment during operation of the IPTV system, the live acquisition server 954 can acquire television content from the broadcast service 956. The live acquisition server 954 in turn can transmit the television content to the AQT switch 952 and the AQT switch can transmit the television content to the CFT switch 930 via the private network 910. Further, the television content can be encoded at the D-servers 932, and the CFT switch 930 can communicate the television content to the modems 914 and 922 via the private access network 966. Additionally, the VOD server 936 may capture and store the television content for later use, such as video-on-demand. The set-top box devices 916 and 924 can receive the television content from the modems 914 and 922, decode the television content, and transmit the content to the display devices 918 and 926 according to commands from the remote control devices 920 and 928.

Additionally, at the acquisition tier 906, the VOD importer server 958 can receive content from one or more VOD sources outside the IPTV system 900, such as movie studios and programmers of non-live content. The VOD importer server 958 can transmit the VOD content to the AQT switch 952, and the AQT switch 952 in turn can communicate the material to the CFT switch 930 via the private network 910. The VOD content can be stored at one or more servers, such as the VOD server 936.

When a user issues a request for VOD content to the set-top box device 916 or 924, the request can be transmitted over the private access network 966 to the VOD server 936 via the CFT switch 930. Upon receiving such a request, the VOD server 936 can retrieve requested VOD content and transmit the content to the set-top box device 916 or 924 across the private access network 966 via the CFT switch 930.

The domain controller 946 communicates with the public network 912 via the second APP switch 940. Additionally, the domain controller 946 can communicate via the public network 912 with the PC 968. For example, the domain controller 946 can display a web portal via the public network 912 and allow users to access the web portal using the PC 968. Further, in an illustrative embodiment, the domain controller 946 can communicate with at least one wireless network access point 978 over a data network 976. In this embodiment, each wireless network access device 978 can communicate with user wireless devices such as a cellular telephone 984.

In a particular embodiment, the set-top box devices can include an STB computer program 974 that is embedded within the STB memory device 972. The STB computer program 974 can contain instructions to receive and execute at least one user television viewing preference that a user has entered by accessing an Internet user account via the domain controller 946. For example, the user can use the PC 968 to access a web portal maintained by the domain controller 946 via the Internet. The domain controller 946 can query the subscriber and system store 948 via the private network 910 for account information associated with the user. In a particular embodiment, the account information can associate the user's Internet account with the second set-top box device 924. For instance, in an illustrative embodiment, the account information can relate the user's account to the second set-top box device 924 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 974 can contain instructions to receive many types of user preferences from the domain controller 946 via the access network 966. For example, the STB computer program 974 can include instructions to receive a request to record at least one television program at a video content storage module such as a digital video recorder (DVR) 982 within the second set-top box device 924. In this example embodiment, the STB computer program 974 can include instructions to transmit the request to the DVR 982, where the television program(s) are recorded. In an illustrative embodiment, the STB computer program 974 can include instructions to receive from the DVR 982 a recording status with respect to one or more of the television programs and to transmit at least one message regarding the status to a wireless device, such as the cellular telephone 984. The message can be received at the CFT switch 930, for instance, and communicated to the domain controller 946 across the private network 910 via the second APP switch 940. Further, the domain controller 946 can transmit the message to the wireless data network 976, directly or via the public network 912, and on to the wireless network access point 978. The message can then be transmitted to the cellular telephone 984. In an illustrative embodiment, the status can be sent via a wireless access protocol (WAP).

Figure 10:
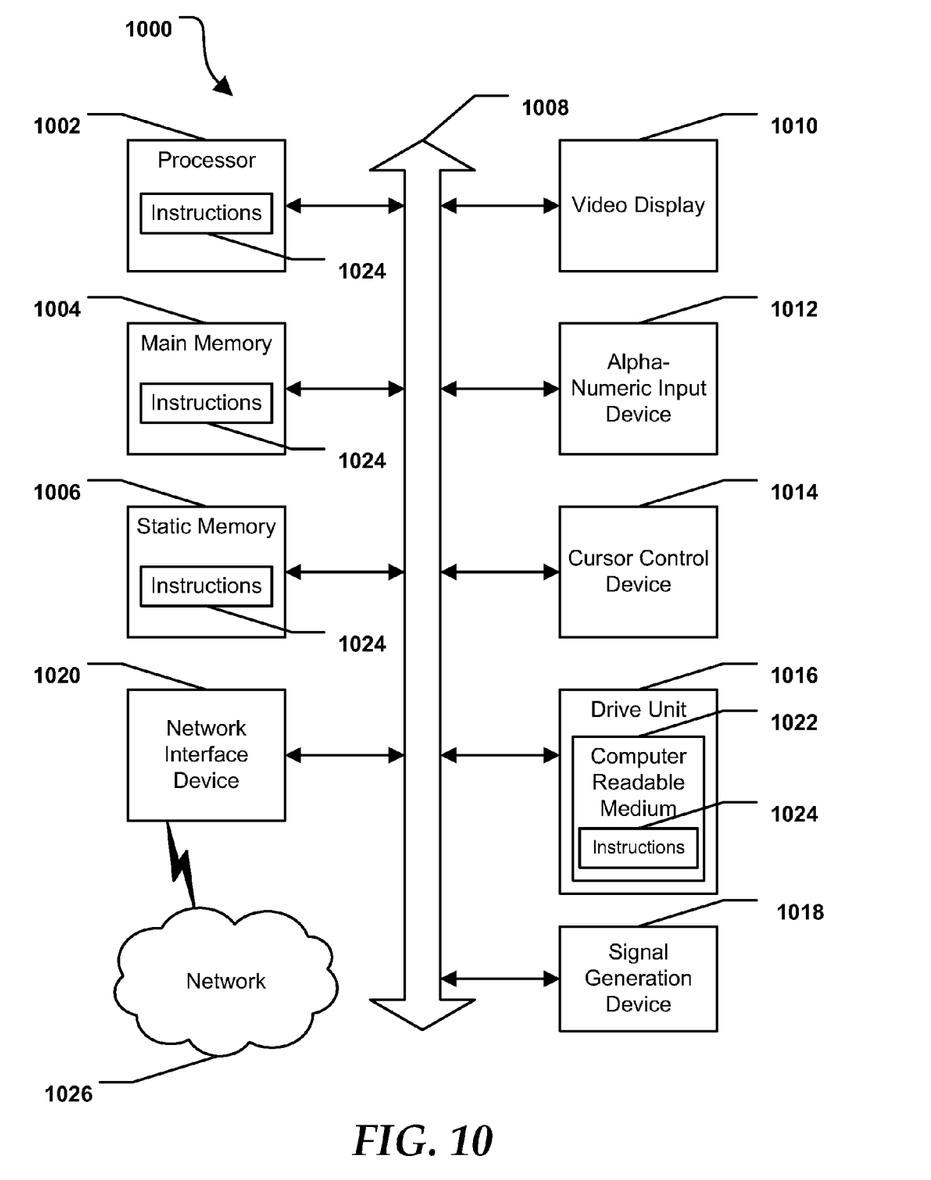
FIG. 10 is an illustrative embodiment of a general computer system.

FIG. 10 shows an illustrative embodiment of a general computer system 1000. The computer system 1000 can include a set of instructions that can be executed to cause the computer system to perform any one or more of the methods or computer based functions disclosed herein. The computer system 1000 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

The computer system 1000 may include a processor 1002, such as a central processing unit (CPU), a graphics processing unit (GPU), or both. Moreover, the computer system 1000 can include a main memory 1004 and a static memory 1006 that can communicate with each other via a bus 1008. As shown, the computer system 1000 may further include a video display unit 1010 such as a liquid crystal display (LCD), an organic light emitting diode (OLED), a flat panel display, a solid-state display, or a cathode ray tube (CRT). Additionally, the computer system 1000 may include an input device 1012 such as a keyboard, and a cursor control device 1014 such as a mouse. Alternatively, input device 1012 and cursor control device 1014 can be combined in a touchpad or touch sensitive screen. The computer system 1000 can also include a disk drive unit 1016, a signal generation device 1018 such as a speaker or remote control, and a network interface device 1020 to communicate with a network 1026. In a particular embodiment, the disk drive unit 1016 may include a computer-readable medium 1022 in which one or more sets of instructions 1024, such as software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of providing video-on-demand content, comprising:

storing, by a system comprising a processor, a plurality of beginning portions of a plurality of video-on-demand content;

receiving, by the system, a request from a set-top box for selected content of the plurality of video-on-demand content;

streaming, by the system, to the set-top box a beginning portion of the selected content from the plurality of beginning portions of the plurality of video-on-demand content;

determining, by the system, that a remaining portion of the selected content of the plurality of video-on-demand content is not stored locally;

identifying, by the system, a plurality of peers that are likely to have the remaining portion of the selected content by checking a plurality of bloom filters responsive to determining that the remaining portion is not stored locally, wherein the plurality of bloom filters indicate the plurality of video-on-demand content that is stored at the plurality of peers;

selecting, by the system, a first peer of the plurality of peers that are identified, wherein the first peer stores a copy of the selected content according to a source policy that is received from a directory server based on factors that affect transmission of the selected content, and wherein the first peer is selected from the plurality of peers according to a hash of a content identifier associated with the selected content;

receiving, by the system, the remaining portion of the selected content from the first peer that is selected; and streaming, by the system, to the set-top box the received remaining portion of the selected content.

2. The method of claim 1 wherein locally is at a video hub office, a video-on-demand server, a mass storage system, or any combination thereof.

3. The method of claim 1 comprising receiving a middle portion of the selected content from a second peer.

4. The method of claim 1 comprising:
storing the received remaining portion of the selected content locally; and
notifying the directory server that the received remaining portion of the selected content is stored locally.

5. The method of claim 1 comprising receiving the plurality of bloom filters from a root server.

6. The method of claim 1 further comprising updating a local bloom filter indicating the selected content stored locally.

7. The method of claim 6 further comprising providing the local bloom filter that is updated to a root server.

8. A server comprising:
a storage configured to store video-on-demand content;
a memory to store executable instructions; and
a processor couple to the storage and the memory, wherein the executable instructions, when executed by the processor facilitate performance of operations comprising:
storing a plurality of beginning portions of a plurality of video-on-demand content;
receiving a request from a set-top box for selected content of the plurality of video-on-demand content;
providing to the set-top box a beginning portion of the selected content from the plurality of beginning portions of the plurality of video-on-demand content;
determining that a remaining portion of the selected content is not in the storage;
determining a plurality of peers that have the remaining portion of the selected content according to a plurality of bloom filters responsive to determining that the remaining portion is not in the storage, wherein the plurality of bloom filters indicate the plurality of video-on-demand content that is stored at the plurality of peers;
identifying a first peer of the plurality of peers that are determined, wherein the first peer stores a copy of the selected content according to a source policy of a directory server based on transmission of the selected content, and wherein the first peer is identified from the plurality of peers according to a hash of a content identifier associated with the selected content;
receiving the remaining portion of the selected content from the first peer that is identified; and
providing the received remaining portion of the selected content to the set-top box.

9. The server of claim 8 wherein the operations further comprise receiving a middle portion of the selected content from a second peer.

10. A server for providing video-on-demand content, comprising:
a memory to store executable instructions; and
a processor communicatively coupled to the memory, wherein the executable instructions, when executed by the processor, facilitate performance of operations comprising:
storing a plurality of beginning portions of a plurality of video-on-demand content;
receiving a request from a set-top box for selected content of the plurality of video-on-demand content;
providing to the set-top box a beginning portion of the selected content from the plurality of beginning portions of the plurality of video-on-demand content;
identifying a plurality of peers that are likely to have a remaining portion of the selected content according to a bloom filter, wherein the bloom filter indicates the plurality of video-on-demand content that is stored at the plurality of peers;
selecting a first peer of the plurality of peers that are identified, wherein the first peer stores a copy of the selected content according to a source policy of a directory server according to transmission factors for the selected content, and wherein the first peer is selected from the plurality of peers according to a hash of a content identifier associated with the selected content;
receiving the remaining portion of the selected content from the first peer;
storing the received remaining portion of the selected content; and
streaming the received remaining portion of the selected content to the set-top box.

11. The server of claim 10 wherein the operations further comprise:
identifying a second peer server having a second portion of the selected content; and
receiving the second portion of the selected content from the second peer server.

12. The server of claim 10 wherein the operations further comprise requesting a peer identifier from the directory server, wherein the peer identifier indicates a peer likely to have the selected content.

* * * * *